Oct. 26, 1948.　　　　R. R. LEISKE　　　　2,452,249
DRIER FOR GRANULAR PLASTIC
Filed March 4, 1946
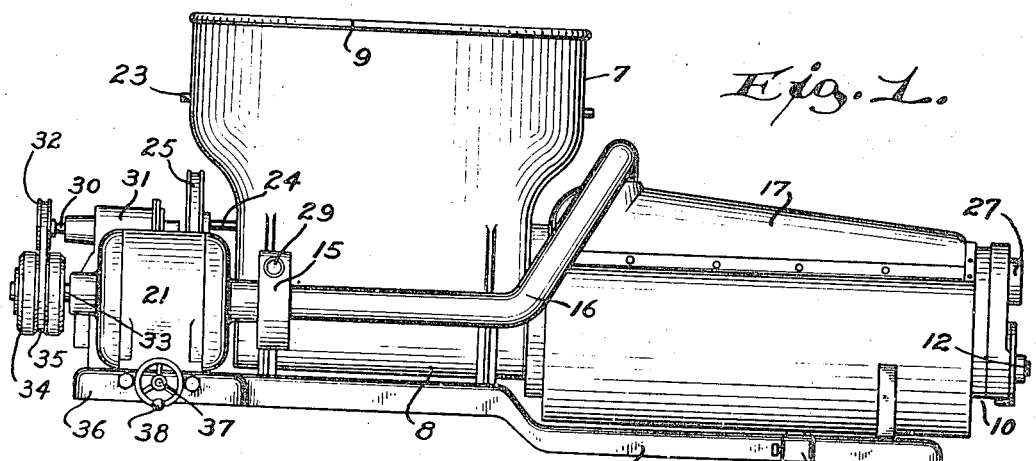
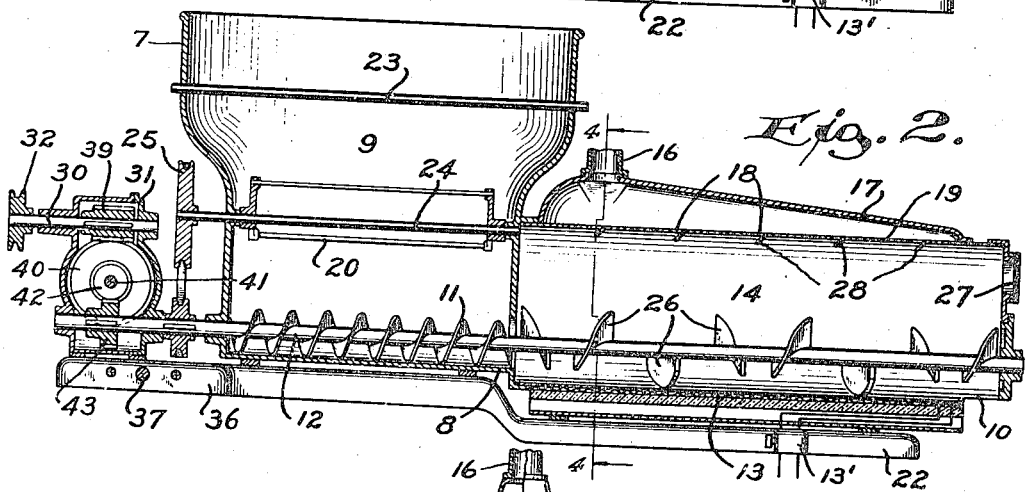
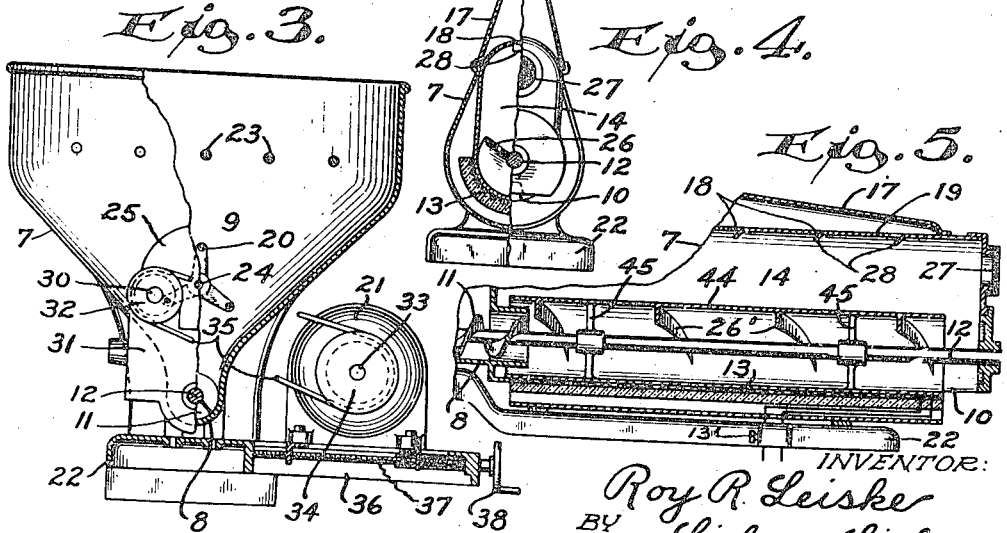
INVENTOR:
Roy R. Leiske
BY Lieber & Lieber
ATTORNEYS Patented Oct. 26, 1948

2,452,249

UNITED STATES PATENT OFFICE 2,452,249

DRIER FOR GRANULAR PLASTIC

Roy R. Leiske, Milwaukee, Wis.

Application March 4, 1946, Serial No. 651,864

2 Claims. (Cl. 34—183)

The present invention relates generally to improvements in the art of manufacturing diverse articles from plastics, and relates more specifically to improvements in the construction and operation of mechanism for conditioning materials such as granular or powdered plastic stock.

The primary object of my present invention is to provide an improved unit for effecting automatic and thorough mixing, drying and preheating of a constantly advancing stream of granular or powdered material, and especially plastic stock, as it travels from a supply source toward a molding machine for the finished plastic articles.

In the art of molding plastic articles it is necessary in order to insure rapid production of successive perfect specimens, that excessive moisture be removed from the plastic stock before it is admitted to the final molding machine. This granular or powdered plastic stock is ordinarily supplied in bulk with relatively large batches thereof confined in open containers, and is susceptible of absorbing and confining considerable moisture which, if admitted to the molding machines, necessitates prolonged curing time and thus materially delays production. The excess moisture should therefore be removed and should preferably be eliminated just prior to the introduction of the stock material to the molding apparatus. In order to avoid loss of time and to enhance production as much as possible, it is also desirable to preheat as well as to dry the stock material and to deliver the preheated dry granular plastic material in the form of a continuous rapidly advancing stream directly into the receiving hopper of the molding device, and so far as known, no mechanism for accomplishing these desirable results has heretofore been commercially developed and marketed.

It is therefore a more specific object of the present invention to provide improved mechanism for converting successive batches of granular or powdered plastic stock into a rapidly progressing stream, and for effectively removing excess moisture from the advancing mass of material while also preheating the material without danger of scorching it.

Another specific object of this invention is to provide a simple and compact granular or powdered material drying unit especially adapted to treat plastic stock, which may be readily applied to or operatively associated with the inlets of various types of plastic article molding machines.

A further specific object of my invention is to provide an improved granular or powdered material feeding, agitating, preheating and drying assemblage which will not clog, and wherein all moving parts are driven by a common motor through simple driving mechanism which is readily adjustable to vary the operating characteristics of the assemblage.

Still another specific object of the invention is to provide an improved continuous dryer and preheater for plastic stock or the like, which is durable in construction, and which may also be manufactured and operated at moderate cost.

An additional specific object of the present invention is to provide an efficient drying and preheating unit for granular or powdered material, which is continuous and automatic in action, and in which the excess moisture is rapidly and effectively removed while possible scorching is positively prevented.

These and other specific objects and advantages of the present invention will be apparent from the following detailed description.

A clear conception of the features constituting my present improvement, and of the mode of constructing and operating dryer and preheating units embodying the invention, may be had by referring to the drawings accompanying and forming a part of this specification wherein like reference characters designate the same or similar parts in the various views.

Fig. 1 is a side elevation of one of my improved continuous granular or powdered material treating units;

Fig. 2 is a central longitudinal vertical section through the unit of Fig. 1;

Fig. 3 is a part sectional end view of the same unit, looking toward the inlet end thereof;

Fig. 4 is a transverse vertical section through the preheating and drying zone of the unit, taken along the line 4—4 of Fig. 2; and Fig. 5 is a fragmentary longitudinal vertical section through a modified type of preheating and drying assemblage.

While the invention has been shown and described herein as being especially applicable to electrically driven and heated units for continuously agitating, preheating and drying granular or powdered materials for producing plastic articles, it is not my desire or intention to unnecessarily restrict the utility of the improvements by virtue of this limited disclosure.

Referring particularly to Figs. 1 to 4, inclusive, of the drawing, the improved material treating unit shown therein comprises in general a main housing or casing 7 forming an elongated approximately horizontal trough 8 having an inlet hopper or supply opening 9 at one end and a material discharge opening or outlet 10 at its opposite end; a rotary agitating and conveying screw 11 mounted upon a main shaft 12 and being cooperable with the bottom of the trough 8 to constantly stir and advance granular or powdered material along the casing 7 from the inlet 9 to the outlet 10; means such as a thermostatically controlled electric heater 13 for heating the portion or zone of the trough 8 between the material inlet and outlet; a suction device or blower 15 having an inlet conduct 16 communicating with the heating zone 14 through a hood 17 and a series of baffle openings 18 formed in the top enclosure 19 of this zone, for constantly removing vapor from within the heating zone; a mixing and bridge preventing rotor 20 mounted in the inlet opening 9 of the casing 7; common means such as an electric motor 21 for simultaneously rotating the conveyor screw 11 and rotor 20 and for driving the exhaust blower 15; and mechanism for readily varying the speed of operation of the conveyor 11 and mixing rotor 20.

The main casing 7, motor 21, and the transmission mechanism, may be mounted upon a common base 22 so as to provide a single unitary assemblage adapted to be mounted as a unit upon various types of plastic article molding machines, and the casing 7 may be formed of sheet metal or other suitable material. The hopper 9 is preferably provided with a series of transverse bars 23 located above the rotor 20, for supporting successive containers or receptacles for granular or powdered stock, in inverted position upon the treating unit; and the revolving rotor 20 comprises an annular series of rods mounted upon a shaft 24 and is operable to prevent bridging of the gravitating stock across the inlet opening and to agitate and loosen the entering stock. The shafts 24, 12 may be journalled for rotation in the casing 7 in any convenient manner, and the agitator shaft 24 may be driven from the conveyor shaft 12 through a V-belt drive 25, or otherwise.

The portion of the rotary conveyor 11 disposed beneath the inlet opening 9, may be formed as a continuous helical flight, but the portion of this conveyor which is located within the heating zone 14, preferably consists of a series of segregated flights 26 which cooperate to form a mutilated helix or screw adapted to thoroughly mix and agitate the material as it advances toward the outlet opening 10. The heater 13 may be of a conventional electric type thermostatically controlled so as to limit the degree of heating, and this heater 13 should be externally insulated as shown, so as to transfer heat only through the trough 8 into the heating zone 14. The end wall of the casing 7 nearest the outlet 10, is provided with an air inlet filter 27, and the openings 18 in the top plate 19 of the heating and agitating zone 14 are preferably provided with baffles 28 inclined as shown, in order to cause the vapor removing air to most effectively circulate throughout the zone 14. The suction blower 15 which has its intake conduit 16 connected with the openings 18 through the hood 17, may be of any suitable type direct connected to the driving motor 21, and has a discharge or outlet opening 29; and the intake conduit 16 should be sufficiently flexible to permit adjustment of the motor 21 as hereinafter described.

It is desirable in order to insure most efficient agitating, pre-heating and drying of the material treated by the unit, to be able to vary the speed of rotation of the conveyor 11 so as to lengthen or shorten the time of treatment, and such variation in time may be readily effected by utilizing driving mechanism such as shown in the drawing. Since the motor 21 is ordinarily operable at much higher speed than is desired at the conveyor 11, it is also desirable to provide speed reduction means for the conveyor driving shaft 12, and in the improved unit, the mechanism for varying and reducing the speed of rotation of the conveyor 11 is interposed between the motor 21 and the main shaft 12.

A countershaft 30 is journalled for rotation in a gear casing 31 mounted upon the base plate 22, and has a unitary or one-piece sheave 32 provided with a peripheral V-shaped groove, secured to its outer end. The motor shaft 33 is provided with a two section sheave 34, the sections of which cooperate and are urged toward each other to provide a V-groove of variable width, and a resilient endless V-belt 35 coacts with the alined grooves of the two sheaves 32, 34. The motor 21 is slidably mounted upon an auxiliary bracket 36 secured to the base 22, and is adjustable toward and away from the base 22 by means of a screw 37 and a hand wheel 38, so that the belt 35 may be caused to forcibly separate the sections of the driving sheave 34 more or less and to ride within the groove of this sheave different distances from the axis of the motor shaft 33, thereby varying the speed of rotation of the driven sheave 32 and shaft 30. This type of variable speed mechanism is well known to the trade, and may be utilized to vary the speed of rotation of the conveyors 11, 26 throughout a considerable range.

The speed reducing gearing which is housed within gear casing 31, may be of any suitable type, and as shown, this gearing comprises a helical toothed pinion 39 secured to the countershaft 30 and meshing with a helical gear 40 secured to a second countershaft 41 journalled in the casing 31; and a worm 42 secured to the shaft 41 and drivingly coacting with a worm wheel 43 secured to the conveyor shaft 12, see Fig. 2. This gearing will obviously cause the conveyors 11, 26 to be driven at a much lower speed than that of the motor 21, but any changes in speed effected by the speed varying mechanism will cause the rotary conveyors to operate slower or faster as desired, so as to insure most effective drying and pre-heating of the material being treated without scorching or melting the same.

During normal operation of the improved mixing, drying and pre-heating unit, the motor 21 may be operated to constantly revolve the rotor 20 and conveyors 11, 26 at the desired speed, and to simultaneously actuate the suction blower 15 so as to cause atmospheric air to be drawn into the heating zone 14 past the filter 27 and through the opening 10, and to be discharged around the baffles 28 and through the openings 18, hood 17 and conduit 16 to the blower. The heater 13 should also be set to insure proper heating but to avoid overheating, by adjusting its thermostatic control 13' in a well known manner, whereupon successive open topped receptacles containing batches of the granular or powdered material which is to be treated, may be inverted and applied to the supporting bars 23 within the supply hopper 9. The material then drops by gravity into the trough 8 and into the path of the revolving initial conveyor screw 11, while the rotor 20 initially stirs or agitates the descending mass and positively prevents bridging of the material across the hopper outlet.

The initial conveyor screw 11 thoroughly mixes and agitates the granular or powdered substances which are deposited in its path, and gradually but continuously advances the material along the trough 8 and into the heating zone 14. Here the mutilated conveyor or vanes 26 continue the agitation and advancement of the commodity in a step-by-step fashion, and as the particles of material are stirred and subjected to heat from the heater 13, moisture is driven from the mass and rises in the form of vapor into the zone 14. When the material enters the heating zone 14, the greater percentage of the moisture is promptly removed in the initial part of this zone, and residual moisture is thereafter removed as the stream of material advances toward the discharge opening 10. The vapor is quickly removed from the zone 14 by the air being circulated therethrough by the suction blower 15, and the thoroughly dried and pre-heated product is eventually delivered in the form of a continuous stream, through the final discharge opening 10 to the molding machine. In the molding machine, the dried material is subjected to further heating sufficient to melt the same, but the pre-heating afforded by the drier materially reduces the heat necessary for final melting.

While the revolving segregated conveyor vanes 26 of Figs. 1 and 4 will operate satisfactorily, other types of rotary conveyors may be utilized to transport the material through the heating zone 14. One such modified conveyor is shown in Fig. 5, wherein the mutilated conveyor screw or succession of flights 26', is carried by a drum 44 mounted upon the main shaft 12 by means of spiders 45. The periphery of the drum 44 is revolvable in close proximity to the thermostatically controlled electric heater 13, and the opposite ends of the drum are open so as to permit free circulation of air therethrough, and if so desired, some of the air admitted through the filter 27 may be deflected toward the material discharge end of the drum 44 by means of a deflecting plate, or the filter 27 may be located nearer to this open drum end. With such a modified final conveyor assemblage, the granular or powdered material passing through the drum 44 will be elevated and showered across the drum interior while being simultaneously conveyed along the drum by the flights 26'. The vapors resulting from heating, will be constantly withdrawn from within the drum through the open ends thereof, by the air being circulated therethrough, and will be expelled from the zone 14 by the suction blower 15 as previously described.

From the foregoing detailed description it should be apparent that my present invention provides an improved unit for automatically stirring, drying and pre-heating a continuous stream of granular or powdered material in a most efficient manner. The improved unit is obviously simple and compact in construction, and is readily applicable to various types of plastic molding machines, and the several parts of the mechanism may be quickly and conveniently adjusted so as to insure desired operation without danger of over-heating the product. The rotor 20 effectively prevents clogging due to the admission of large masses of granular or powdered material the particles of which have lumped together, and the pre-heating of the final product greatly facilitates its final use in a molding machine. While the improved assemblage is especially adaptable for handling granular or powdered plastic stock, the unit may also be used advantageously for other purposes, and the improved device may be manufactured and operated at moderate cost and functions automatically after proper adjustments have been made.

It should be understood that it is not desired to limit this invention to the exact details of construction or to the precise mode of use, herein shown and described, for various modifications within the scope of the appended claims may occur to persons skilled in the art.

I claim:

1. In a drying unit for granular plastic, a casing having an upwardly open trough section and a horizontally alined enclosed trough section separated from the open section by a partition having a restricted material passage therein, said open section having a downwardly directed open inlet extending throughout its length and said enclosed section having a restricted lower outlet at its end remote from said partition, horizontally alined screw conveyors coacting with the bottoms of the successive trough sections on opposite sides of said partition, the conveyor within said open section having a continuous helical flight of relatively small diameter and pitch and the conveyor within said enclosed section having a periodically interrupted helical flight of larger diameter and greater pitch, an agitator rotatable within said inlet above said smaller conveyor, a suction device for withdrawing vapor upwardly from within said enclosed trough section, and common means for actuating said conveyors and said agitator and said device.

2. In a drying unit for granular plastic, a casing having an upwardly open trough section and a horizontally alined enclosed trough section separated from the open section by a partition having a restricted material passage therein, said open section having a downwardly directed open inlet extending throughout its length and said enclosed section having a restricted lower outlet at its end remote from said partition, horizontally alined screw conveyors coacting with the bottoms of the successive trough sections on opposite sides of said partition, the conveyor within said open section having a continuous helical flight of relatively small diameter and pitch and the conveyor within said enclosed section having a periodically interrupted helical flight of larger diameter and greater pitch, an agitator rotatable within said inlet above said smaller conveyor, a suction device for withdrawing vapor upwardly from within said enclosed trough section, common means for actuating said conveyors and said agitator and said device, and means for heating said enclosed trough section.

ROY R. LEISKE.

REFERENCES CITED

The following references are of record in the file of this patent:

UNITED STATES PATENTS

| Number | Name | Date |
|---|---|---|
| 536,785 | Griesser | Apr. 2, 1895 |
| 640,628 | Bussells | Jan. 2, 1900 |
| 1,023,157 | Lafeuille | Apr. 16, 1912 |
| 1,126,587 | Suzuki | Jan. 26, 1915 |
| 1,190,127 | Disdier | July 4, 1916 |
| 1,301,409 | Du Pont | Apr. 22, 1919 |
| 1,421,283 | Meakin | June 27, 1922 |
| 1,704,413 | Wait | Mar. 5, 1929 |
| 1,795,302 | Forrest | Mar. 10, 1931 |
| 1,988,678 | Arnold | Jan. 22, 1935 |
| 2,295,918 | Thomas | Sept. 15, 1942 |
| 2,334,015 | Levine et al. | Nov. 9, 1943 |